United States Patent [19]
Stickler et al.

[11] Patent Number: 5,223,651
[45] Date of Patent: Jun. 29, 1993

[54] SUPERSONIC COMBUSTION ENGINE AND METHOD OF COMBUSTION INITIATION AND DISTRIBUTION

[75] Inventors: David B. Stickler, Carlisle; Alexander Ballantyne, Winchester; Kyu-Man Jeong, Bedford, all of Mass.

[73] Assignee: Avco Corporation, Providence, R.I.

[21] Appl. No.: 491,338

[22] Filed: Mar. 8, 1990

[51] Int. Cl.$^5$ .............................................. F02K 7/08
[52] U.S. Cl. ........................... 60/218; 60/270.1; 60/204; 60/203.1
[58] Field of Search ............... 60/218, 270.1, 39.06, 60/203.1, 204

[56] References Cited

U.S. PATENT DOCUMENTS

| | | | |
|---|---|---|---|
| 2,257,331 | 2/1952 | Jordan | 219/14 |
| 2,748,565 | 6/1956 | Billman et al. | 60/39.03 |
| 2,775,863 | 1/1957 | Traverse et al. | 60/35.4 |
| 2,914,911 | 12/1959 | Richter | 60/35.6 |
| 2,975,375 | 3/1961 | Goldstein | 331/78 |
| 3,002,351 | 10/1961 | Sloan | 60/39.72 |
| 3,049,883 | 8/1962 | Sloan | 60/39.72 |
| 3,075,353 | 1/1963 | Mullaney et al. | 60/39.74 |
| 3,087,472 | 4/1963 | Asakawa | 123/1 |
| 3,355,891 | 12/1967 | Rhodes | 60/270 |
| 3,449,913 | 6/1969 | Grebe | 60/204 |
| 3,521,453 | 7/1970 | Breen et al. | 60/207 |
| 3,621,658 | 11/1971 | Grebe | 60/205 |
| 3,651,644 | 3/1972 | Breen et al. | 60/203 |
| 3,783,616 | 1/1974 | Norman et al. | 60/204 |
| 3,811,280 | 5/1974 | Wharton et al. | 60/218 |
| 3,841,824 | 10/1974 | Bethel | 431/8 |
| 3,943,706 | 3/1976 | Grafwallner et al. | 60/204 |
| 4,035,131 | 7/1977 | Cerkanowicz | 431/6 |
| 4,214,442 | 7/1980 | Reingold | 60/270 |
| 4,302,933 | 12/1981 | Smith | 60/261 |
| 4,556,020 | 12/1985 | Hickling | 123/143 B |
| 4,726,336 | 2/1988 | Hoppie et al. | 123/292 |
| 5,072,581 | 12/1991 | Harshman | 60/270.1 |

OTHER PUBLICATIONS

J. Appl. Physics, Sep. 15, 1987, Gilgenbach et al. "Effects of Electron Beam Injection of Ethylene-Air Combustion" 3 pages.

Primary Examiner—Michael J. Carone
Attorney, Agent, or Firm—Perman & Green

[57] ABSTRACT

A supersonic combustion air breathing jet engine and method of igniting fuel. The engine has means for providing a spatially controlled combustion distribution of fuel with an ignitor that provides a volumetrically diffuse discharge of energy to initiate a controlled relatively rapid combustion of fuel in a combustion zone such that combustion distribution in relatively high speed gas flows through the combustion zone can be initiated and controlled without dependence upon a flame holder or relatively high local static gas temperature in the combustion zone.

25 Claims, 3 Drawing Sheets

SUPERSONIC COMBUSTION ENGINE AND METHOD OF COMBUSTION INITIATION AND DISTRIBUTION

BACKGROUND OF THE INVENTION

1. Field of the Invention

The present invention relates to supersonic combustion engines and, in particular, to a supersonic engine having means for providing a spatially controlled combustion initiation and distribution for a controlled relatively rapid combustion.

2. Prior Art

Air breathing propulsion at high flight Mach number, such as above Mach 5, can usefully employ a ramjet with internal supersonic combusting flow. The present invention specifically addresses this type of engine family. Supersonic jet engines generally include ramjets, pulsejets, and rocket motors. Various different types of supersonic jet engines exist in the prior art as well as different types of ignition methods in the reaction engine family. Combustion instability in supersonic combustion jet engines, in the form of pressure waves coupled with fuel/air chemical heat release, is a well known and often severe problem with supersonic combustor design and operation. U.S. Pat. No. 4,035,131 by Cerkanowicz discloses a method and apparatus for controlling the initiation and completion of self-sustaining combustion in fuel/oxidizer mixtures in a gas turbine engine through the use of ultraviolet radiation absorbed throughout the mixture. Cerkanowicz also discloses use of multiple ultraviolet sources used in sequence or phased according to preselected timing sequences. U.S. Pat. No. 2,587,331 by Jordan discloses disassociation and ionization of gaseous particles. U.S. Pat. No. 4,173,122 by Wilkinson discloses an intermittent burning ramjet engine where fuel is cyclically ignited at a predetermined frequency. U.S. Pat. No. 3,651,644 by Breen et al. discloses initiation of decomposition of monopropellant fuels or oxidizers through the use of an electric potential. U.S. Pat. No. 3,449,913 by Grebe discloses ignition of fuel by use of spark discharge along the length of the combustion chamber, laser beams, positive ion beams and electron gun beams. U.S. Pat. No. 3,621,658 by Grebe discloses encompassing the combustion zone with a magnetic field. U.S. Pat. No. 4,726,336 by Hoppie et al. discloses an arrangement and method for enabling hypergolic combustion of a fuel mixture in the combustion chamber of a combustion device such as an internal combustion engine by irradiation of the fuel and/or of the fuel-air mixture with a beam of ultraviolet radiation to produce disassociation of a relatively high proportion of the fuel molecules to enable hypergolic combustion. Various arrangements are disclosed for accomplishing UV irradiation of the fuel in the context of an internal combustion piston engine, and a mercury vapor lamp or a laser are alternatively employed as a UV beam generator.

Various problems exist with supersonic combustion jet engines. One problem is that structural flame holders or high local static temperature which are necessary for controlled ignition in supersonic combustors having high Mach number gas flow therethrough decrease efficiency and limit flight envelopes for flight vehicles propelled by supersonic jet engines.

Another problem is that supersonic jet propulsion for hypersonic flight requires distributed heat release along the flow path. Heat distribution must be varied with flight conditions, such as velocity, altitude and acceleration, for optimum performance. Prior art supersonic jet engines require variation of fuel distribution to produce selective localized initiation along the length of the flow duct to control heat release and thus require a multiplicity of fuel injectors and controls to approximate optimized performance.

Another problem is that Hydrogen is considered the optimum fuel for supersonic combustion because, in part, it ignites with the use of relatively low energy ignition and combusts more rapidly than other fuels. However, other fuels such as hydrocarbons; e.g.: liquid methane, although potentially advantageous in terms of vehicle design because of higher density and decreased fuel tank volume with resulting potential decreases in vehicle drag losses and fuel tank mass, cannot be as rapidly combusted as hydrogen in an acceptable gas flow time scale in a supersonic jet engine.

It is therefore an objective of the present invention to provide a supersonic jet engine and method for controlled spatially distributed ignition in supersonic combustor flows without dependence on structural flame holders or relatively high local static temperature.

It is another objective of the present invention to provide a supersonic jet engine and method for controlling spatial heat release distribution in supersonic combustion for optimum engine performance.

It is another objective of the present invention to provide a supersonic jet engine and method with ignition and combustion rate enhancement of fuels in supersonic combustion for allowing use of a variety of different fuels in supersonic jet engines.

SUMMARY OF THE INVENTION

The foregoing problems are overcome and other advantages are provided by a supersonic jet engine having means for providing a spatially controlled combustion distribution.

In accordance with one embodiment of the present invention, a supersonic combustion ramjet engine is provided having a combustor with a combustion zone intended to channel gas flow at relatively high speeds therethrough. The engine comprises means for substantially continuously supplying fuel into the combustion zone and means for substantially instantaneously igniting an area of fuel in the combustion zone for providing a spatially controlled combustion distribution. The igniting means has means for providing a volumetrically diffuse discharge of energy into the combustion zone. The means for discharging energy is capable of generating free radicals within the area of reactive fuel and air in the combustion zone such that the fuel in the area can initiate a controlled relatively rapid combustion of fuel and air in the combustion zone whereby combustion distribution in relatively high speed gas flows through the combustion zone can be initiated and controlled without dependence upon a flame holder or relatively high local static temperature in the combustion zone.

In accordance with another embodiment of the present invention, a supersonic ramjet engine is provided having a combustor with a combustion flow duct. The engine comprises means for relatively continuously supplying fuel into the combustion flow duct and means for igniting fuel in the combustion flow duct comprising a plurality of initiation sources. Each initiation source has means for providing a spatially distributed ignition of fuel in a predetermined area in the combustion flow duct. The igniting means further comprises means for selectively activating each of the initiation sources to vary intensity, timing, size or location of initiation of combustion and resulting heat release distribution in the flow duct to predetermined conditions whereby heat release can be controlled to optimize pressure distribution and speed of gas flows in the combustion flow duct for various altitudes, acceleration rates and flight speeds of the vehicle propelled by the engine.

In accordance with one method of the present invention, a method is provided for igniting reactive fuel in a combustion zone of a supersonic ramjet engine comprising the steps of supplying reactive fuel relatively continuously into the combustion zone, and discharging a volumetrically diffuse electron flux into a predetermined area of reactive fuel and air in the combustion zone to generate free radicals in the reactive fuel and air and substantially instantaneously initiate rapid combustion from the area such that the combustion can occur in a relatively rapid time scale corresponding to the relatively fast gas flow through the combustion zone and combustion can be initiated and maintained without a flame holder or relatively high unreacted gas static temperature in the combustion zone.

In accordance with another method of the present invention, a method is provided of combusting fuel and controlling heat release distribution in a supersonic combustor comprising the steps of supplying fuel into a combustion flow duct of a combustor of a supersonic ramjet; igniting fuel in the flow duct by means of a plurality of initiation sources, each initiation source having means for providing a spatially distributed ignition of fuel in the flow duct; and varying activation of the individual initiations sources selectively to vary combustion initiation intensity, timing, location or size, and resulting heat release distribution from combustion to optimize gas pressure distribution and gas flow speed in the flow duct.

In accordance with another method of the present invention, a method of initiating combustion of hydrocarbons under relatively low static gas temperature conditions in a supersonic combustor flow duct is provided comprising the steps of supplying hydrocarbon fuel relatively continuously into the flow duct; and discharging energy from an initiation source capable of volumetrically diffusing the energy in the fuel and air mixture, the energy being capable of generating free radicals within the hydrocarbon fuel and air in a spatially distributed manner to produce a spatially distributed ignition of fuel in the flow duct thereby enhancing the rate of combustion such that the hydrocarbon fuel can be combusted at a relatively fast rate and, hence, hydrocarbon fuels can be combusted within an appropriately fast time scale relative to gas flow through the flow duct for use in a supersonic ramjet engine.

In accordance with another method of the present invention, a method is provided for sustaining combustion of a stoichiometrically lean fuel under relatively low static gas temperature conditions in a supersonic combustor flow duct comprising the steps of supplying fuel relatively continuously into the flow duct; and producing free radicals from the fuel and air in the flow duct by means of an initiation source which can produce a spatially distributed ignition of fuel, the free radicals being produced along a substantial length of the combustion flow duct, such that initiation of the fuel occurs over a relatively large area and length of the flow duct to allow sustained combustion in relatively fuel lean stoichiometry, relatively low static gas temperature conditions and relatively fast time scale relative to the supersonic gas flow through the flow duct.

In accordance with another method of the present invention, a method of combusting fuel in a supersonic combustor flow duct of a ramjet engine is provided comprising the steps of supplying a fuel mixture substantially continuously into the flow duct, the fuel mixture comprising a first type of fuel and a second type of fuel, the first type of fuel being capable of reacting relatively readily at initial low free radical concentration to provide combustion; and igniting the fuel mixture in the flow duct by discharging volumetrically diffuse energy in the fuel and air mixture to produce free radicals from the first type of fuel sufficient to initiate combustion of the first type of fuel and which provides a chemical source of free radicals and gas temperature increase for ignition of the second type of fuel within an appropriately fast time scale relative to gas flow through the flow duct for use in a supersonic ramjet engine.

BRIEF DESCRIPTION OF THE DRAWINGS

The foregoing aspects and other features of the present invention are explained in the following description, taken in connection with the accompanying drawings, wherein.

DETAILED DESCRIPTION OF THE INVENTION

Figure 1A:
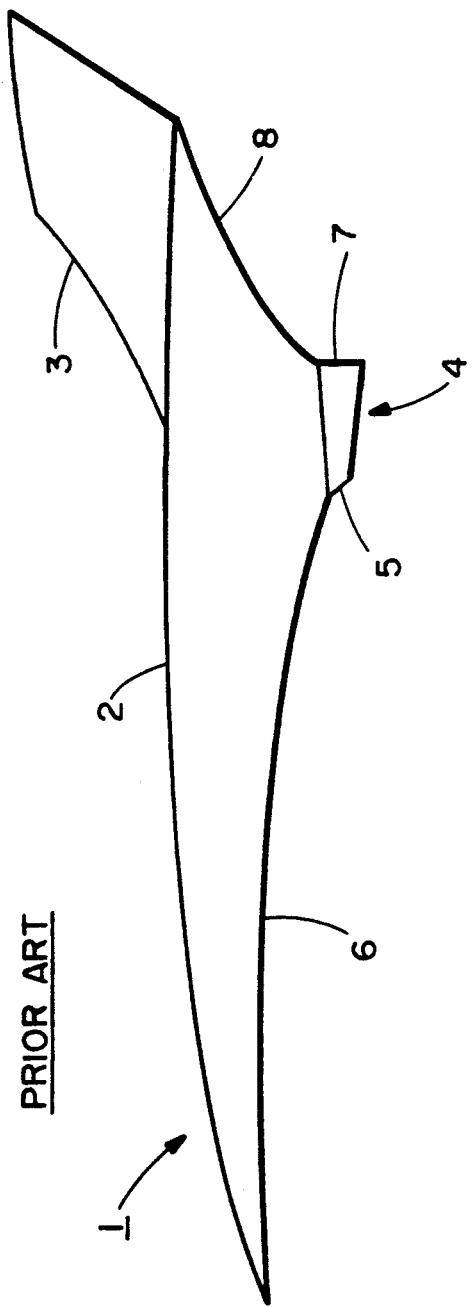
FIG. 1A is a schematic view of a hypersonic air breathing jet propelled flight vehicle.

Referring to FIG. 1A, there is shown a schematic view of a vehicle 1 embodying a hypersonic flight vehicle concept known in the prior art. The vehicle 1 generally comprises a body structure 2, with empennage 3 and engine 4. Substantial inlet air compression and delivery of the air for the engine 4 occurs during flow of the air over the lower forebody 6, resulting in supersonic air delivery to an engine inlet 5. Jet expansion proceeds from an engine exit 7 over the aft body 8 of the vehicle.

Figure 1B:
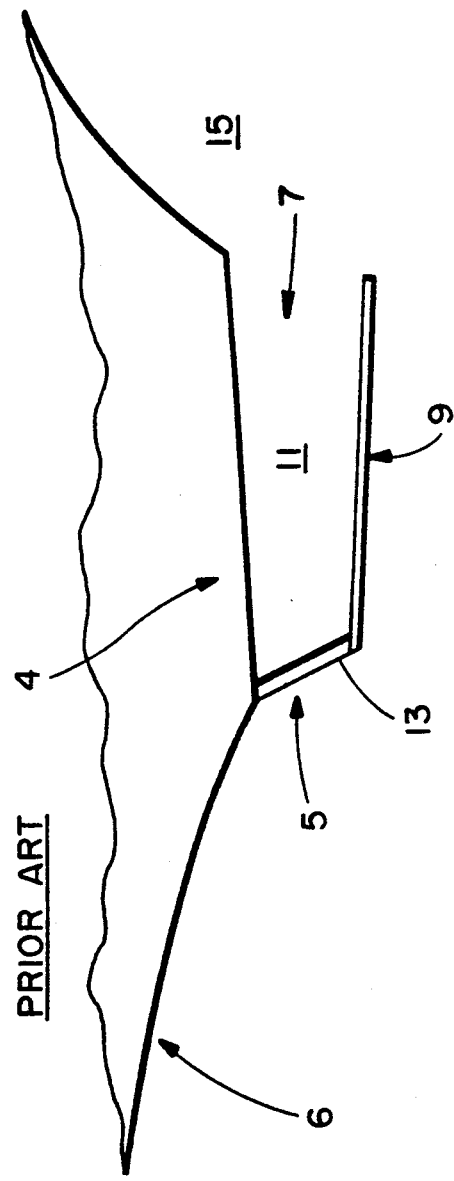
FIG. 1B is a schematic cross-sectional view of a supersonic combustion ramjet engine known in the prior art, as an integral component of a hypersonic flight vehicle.

Referring also to FIG. 1B, there is shown a schematic view of a supersonic combustion ramjet engine 4 known in the prior art. The ramjet engine functions on the jet propulsion principal just like any other reaction engine.

The engine 4 generally comprises a frame 9, an air inlet 5, a combustion zone 11, fuel nozzles and flame holders 13, and an expansion nozzle 15. As its name implies, a ramjet relies entirely upon ram effect to build up the pressure of the air entering the engine, through the external compression of the forebody 6, at the air inlet 5 to an amount of pressure that will enable the engine to operate. Hence, a ramjet must be carried aloft and accelerated to operating speed by some means other than its own thrust. A supersonic combustion ramjet must typically be at a vehicle flight velocity (air speed) of about 1700 m/s (3800 mph) or faster in order to operate. Once air enters into the air inlet 5, in the embodiment shown in FIG. 1B, fuel, such as hydrogen, is injected relatively continuously with the incoming air towards the combustion zone or flow duct 11. Local fuel and air mixing and recirculation or boundary layer flow on the fuel nozzles and flame holder 13 combine with the function of a flame held on the flame holder to ignite the fuel and air as they mix in the combustion zone 11. However, this causes thermodynamic efficiency loss through shock pressure losses, skin friction, and heat transfer. Alternatively, at high flight speed, the air flow in the combustion zone 11 may be at a sufficiently high temperature to initiate rapid combustion as the fuel mixes with the air. However, this alternative initiation process can cause thermodynamic efficiency loss in the form of enhanced exhaust gas dissociation. The combustion gases exit the engine 4 via the expansion nozzle 15 as is known in the art.

Figure 2A:
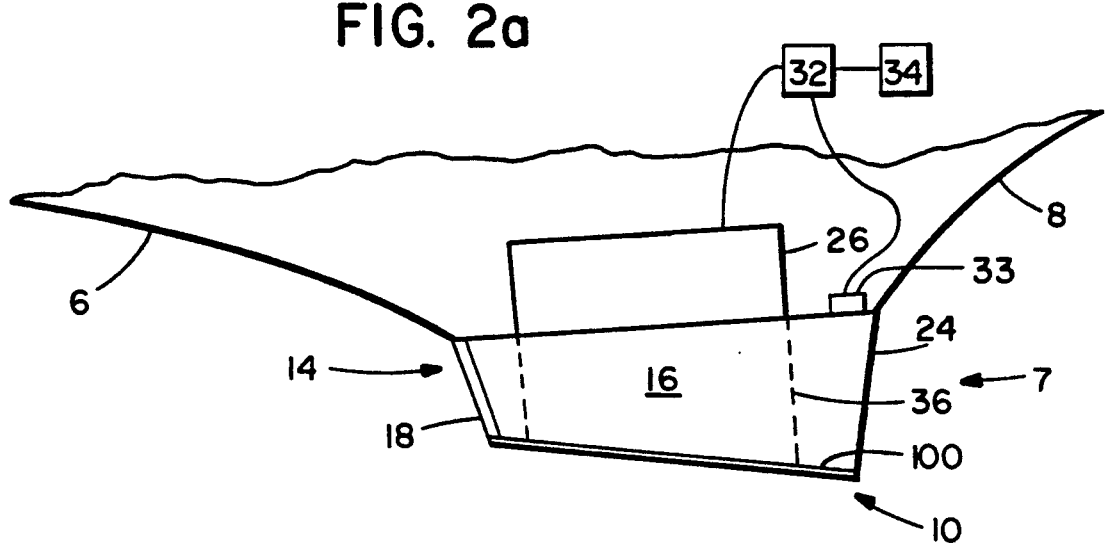
FIG. 2A is a schematic cross-sectional view of a ramjet engine incorporating features of the present invention.

Referring now to FIG. 2A, a supersonic combustion ramjet engine 10 incorporating features of the present invention is shown. In the embodiment shown, the engine 10 comprises an air inlet 14 and gas outlet 24 with a combustion zone or flow duct 16 therebetween. Fuel nozzles 18 are provided proximate the air inlet 14 for injecting fuel into the combustion zone 16. In the embodiment shown, in order to initiate combustion in the combustion zone 16, the engine 10 comprises an initiation source 26. In the embodiment shown, the initiation source 26 is capable of providing a volumetrically diffuse discharge of energy into the combustion zone 16 for substantially uniformly generating a distribution of free radicals within an area of reactive fuel-air mixture in the combustion zone 16, by means of collisional dissociation of fuel molecules and air constituent molecules with the high energy electrons delivered by or produced from the volumetrically diffuse discharge of energy. The free radical species initiate and promote rapid combustion of the fuel-air mixture. Generally, electron-neutral collision can initiate such a combustion process if the collision is energetic enough to cause dissociation of the neutral to form free radicals (e.g., O, H). The following examples are characteristic:

$e^- + H_2 \rightarrow H + H + e^-$;

$e^- + O_2 \rightarrow O + O + e^-$;

$e^- + O_2 \rightarrow O + O^-$; and $e^- + CH_4 \rightarrow CH_3 + H + e^-$ in which the products of reaction can react as described above to produce more free radicals and lead rapidly to combustion products. In air, nitrogen (N) can also dissociate, as $e^- + N_2 \rightarrow N + N + e^-$ While nitrogen is not directly a reactant for combustion, it may substantially contribute such as $N + O_2 \rightarrow NO + O$;

$NO + H \rightarrow OH + N$;

$NO + N \rightarrow N_2 + O$; and $NO + H_2 \rightarrow NHO + H$.

Thus, nitrogen can provide an indirect path to production of H, O, and OH for combustion initiation or acceleration.

The above described volumetrically diffuse discharge of energy results in initiation and combustion of fuel in a controlled relatively rapid combustion process which can be initiated and controlled without dependence upon a flame holder or relatively high local static temperature in the combustion zone 16, but can nonetheless provide sufficiently rapid combustion of the fuel in the combustion zone 16 in the relatively high speed of gas flow through the combustion zone. The initiation source 26 generally is used to provide a nonequilibrium source of free radicals such as atomic oxygen, nitrogen, or hydrogen, in a spatially defined region of the combustion zone 16. In a preferred embodiment of the present invention, the initiation source 26 may be provided as a high energy electron beam. The high energy electrons penetrate the gas volume dissipating energy by production of secondary electrons from collision events. Secondaries, etc. provide the major collision events resulting in free radical formation. In an alternate embodiment of the invention, the initiation source 26 may be comprised of an electron beam as free electron source coupled with an electric field to maintain relatively high electron-neutral collision energy. In another alternate embodiment of the present invention, the initiation source 26 may comprise a relatively high transient electric field to force the diffuse volumetric breakdown followed by an electric field maintaining an electron neutral collision energy appropriate for neutral dissociation. In accordance with another embodiment of the present invention, the initiation source 26 may be provided as a surface discharge of ultraviolet breakdown initiation source as a means of providing volumetric ionization of the fuel-air mixture, the resulting free electrons being accelerated by an applied electric field to provide sufficient electron-neutral collision energy to dissociate the neutral molecules to free radicals as combustion initiators. Obviously, both single duct wall sources and multiple wall sources can be used dependent upon the type of initiation source and duct dimensions. In addition, various different types of initiation sources can be combined in a single engine. Reflecting walls 100 for electron beams, having relatively high atomic number material, can be used to enhance spatial uniformity of free radical generation. Magnetic fields can also be used for electron beam or discharge confinement. The initiation source 26 is generally connected to a controller 32 and a power source 34. The power source 34 generally provides the power for each initiation source 26 to discharge energy into the combustion zone 16. Any suitable type of power source 34 may be used such as an on-board power generator. One type of power generator that can be used would be a system using cryogenic fuel, used as vehicle and engine coolant, expanding the cryogenic fuel vapor through a gas turbine to drive an electrical generator. The controller 32 may include a suitable computer or microprocessor and power control components and circuits, and can generally control the discharge from the initiation source 26. The use of the controller 32 to vary the intensity, sequence, or other initiation factors can generally allow for use of real time combustion diagnostics, such as from sensor 33, to provide input into the controller 32. The controller 32 can use the real time combustion information to avoid combustion instability and/or thermal choking of the supersonic gas flow through the flow duct.

The initiation source 26 generally produces a finite concentration of free radicals as combustion initiators discharged into a spatial region or initiation volume 36 in the combustion zone 16. Detailed chemical kinetic modeling of hydrogen/air chemistry generally shows that the combustion initiation time scale decreases with increasing initial free radical concentration. A free radical concentration of less than 1000 ppm on a molar basis will generally give combustion completion of fuel in a time scale of about 100 microseconds for a premixed hydrogen/air mixture. This is an appropriately fast time scale for spatially defined heat release in the supersonic combustion ramjet environment.

Figure 2B:
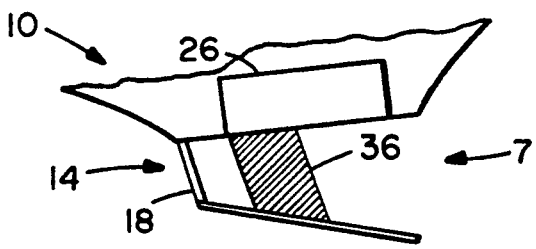
FIG. 2B is a schematic view of heat release distribution in the engine shown in FIG. 2A with a relatively high initiation source intensity.
Figure 2C:
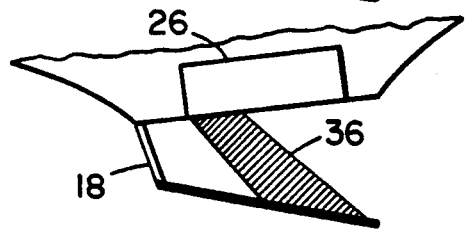
FIG. 2C is a schematic view of heat release distribution in the engine shown in FIG. 2A with a relatively moderate ignition source intensity.
Figure 2D:
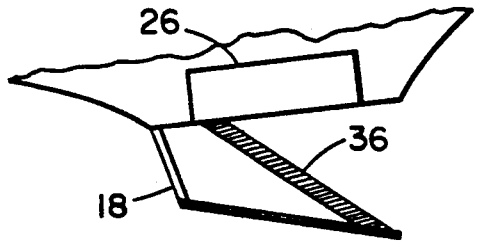
FIG. 2D is a schematic view of heat release distribution for the engine shown in FIG. 2A with a relatively low initiation source intensity.

Referring now to FIGS. 2B, 2C, and 2D, heat release distribution in the combustion zone 16 is shown for three initiation source intensities; high, moderate, and low, respectively. As shown with reference to FIG. 2B, with initiation source intensity being relatively high, the heat release distribution in the combustion zone 16 occurs substantially at the leading portion the combustion zone. In this case, the downstream portion of the initiation source 26 has no beneficial effect and would be eliminated or not operated in a practical realization. As shown in FIG. 2C, with the initiation source at moderate intensity, the heat release distribution in the combustion zone 16 is angled downstream in the reactive gas flow, forming an acute angle with the initiation source 26 surface. That results from relatively more intense electron beam energy deposition closer to the source, with somewhat decreasing intensity at greater distance. As shown in FIG. 2D, with initiation source intensity at a relatively low level, heat release distribution is at a substantially more acute angle with the initiation source 26. Thus, by controlling the initiation source 26 intensity of discharge, the heat release distribution can be varied to optimize engine performance over a range of vehicle flight conditions.

Figure 3A:
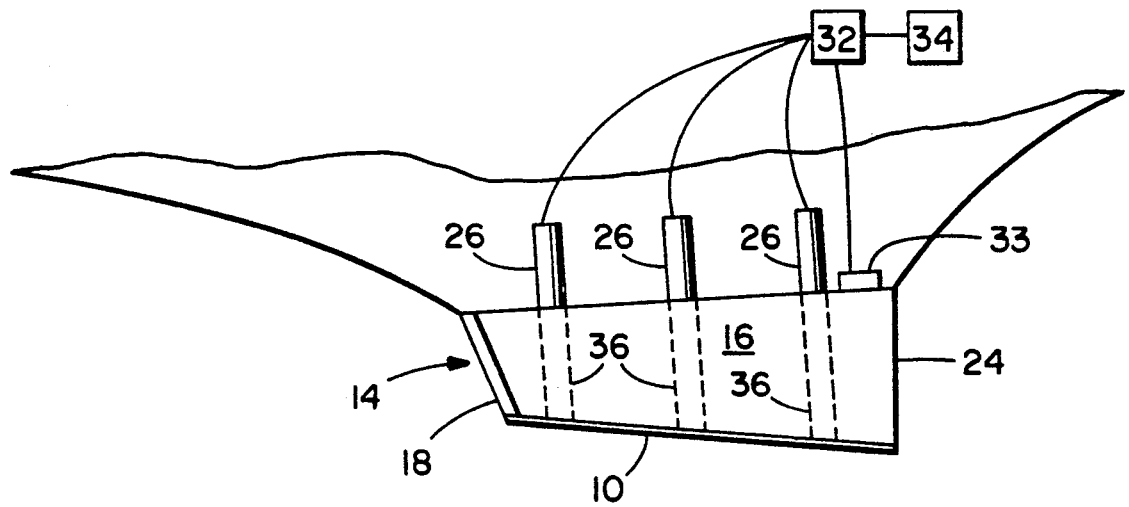
FIG. 3A is a schematic cross-sectional view of an alternate embodiment of the present invention.
Figure 3B:
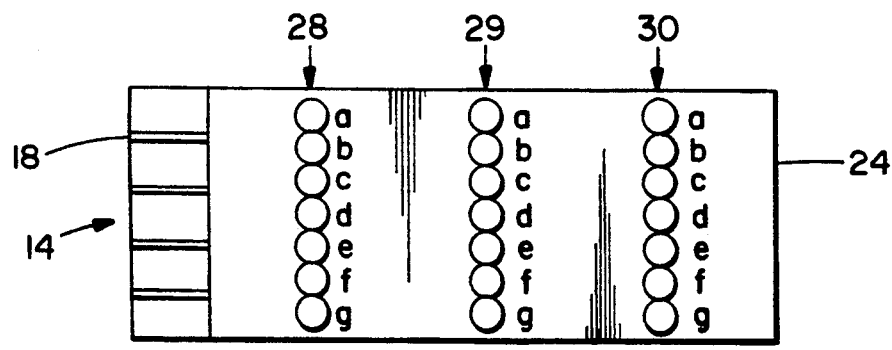
FIG. 3B is a schematic plan view of the engine shown in FIG. 3A.

Referring now to FIGS. 3A and 3B, an alternate embodiment of a supersonic combustion ramjet engine 10 incorporating features of the present invention is shown. In the embodiment shown, the engine 10 comprises an air inlet 14 and gas outlet 24 with a combustion zone or flow duct 16 therebetween. Fuel nozzles 18 are provided proximate the air inlet 14 for injecting fuel into the combustion zone 16. In the embodiment shown, in order to initiate combustion in the combustion zone 16, the engine 10 comprises a plurality of initiation sources 26. In the embodiment shown, each initiation source 26 is capable of providing a volumetrically diffuse discharge of energy into the combustion zone 16 for substantially instantaneously igniting an area of fuel in the combustion zone 16, thus providing a spatially controlled combustion distribution by generating free radicals within the area of reactive fuel in the combustion zone 16. This results in initiation and combustion of fuel in a controlled relatively rapid combustion process which can be initiated and controlled without dependence upon a flame holder or relatively high local static temperature in the combustion zone 16, but nonetheless provide sufficiently rapid combustion of the fuel in the combustion zone for the relatively high speed of gas flows through the combustion zone. In the embodiment shown, the initiation sources 26 are generally provided in three rows, 28, 29, and 20, which are substantially transverse to the flow path of gases through the combustion zone. Each initiation source 26 generally provides a directional flux of high energy electrons, or a spatially restricted volume of electron production, as indicated by initiation regions 36. The sources 26 are controlled and power distributed by a controller 32, from a power source 34. Supersonic combustion ramjet propulsion for hypersonic flight preferentially uses distributed heat release along the flow path with heat released distribution being varied with flight conditions such as Mach number, altitude, and acceleration in order to obtain optimum engine performance. Localizing initiation of combustion with volumetric electrical discharge free radical production results in direct control of heat release location in the combustion zone 16. In the embodiment shown, the multiple initiation sources 26 are distributed transversely to and axially with the gas flow such that they can be used selectively to provide real time control of heat release, and correspondingly optimizing Mach number and pressure distribution of the engine 10 without choking of the flow. Each of the initiation sources 26 can be controlled by the controller 32 to selectively force localized or distributed combustion heat release, with the distribution within the combustion zone being varied to optimize system performance over a range of vehicle flight conditions. The variation is achieved by control of the number and location of the initiation sources 26 being discharged and/or the intensity of their discharge and thus the intensity of free radical generation. This allows for control of flow Mach number and static pressure distribution within the combustion zone 16. Various implementations of the number of initiation sources 26 discharged in each row can be achieved. In one type of implementation, all of the initiation sources in the first row 28 may be discharged for an entry ignition of fuel in the combustion zone 16. In another implementation where entry ignition is emphasized, but not total, ignition sources a, c, e, and g may be discharged in the first row 28 and initiation sources in the second row 29 may include b, d, and f. In yet another implementation where a distributed initiation is desired, initiation sources b and f in row 28 may be discharged, initiation sources c, d, and e in the second row 29 may be discharged, and initiation sources a and g may be discharged in the third row 30. Obviously, any suitable sequence of initiation sources 26 in any of the rows 28, 29, and 30 can be used to optimize engine performance.

Figure 4:
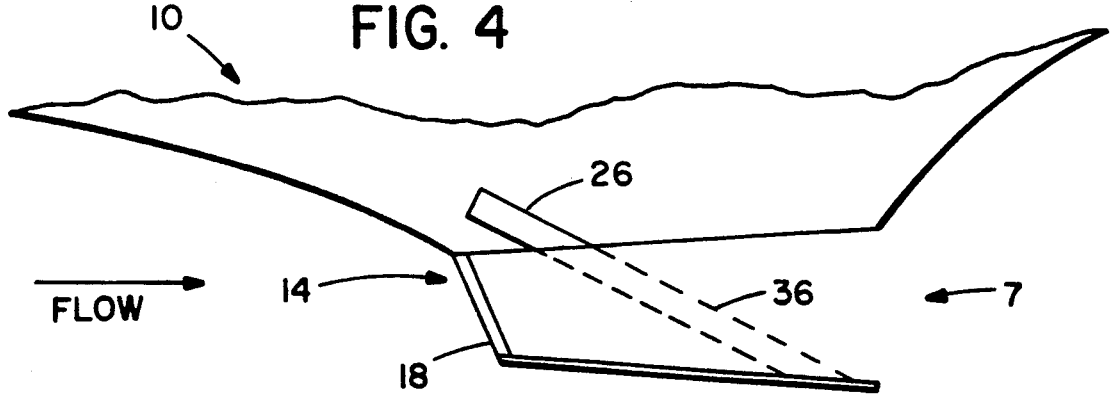
FIG. 4 is a partial schematic view of an alternate embodiment of the present invention.

Referring to FIG. 4, an alternate embodiment of the present invention is shown wherein an initiation source 26 is angled relative to the flow path through the combustion zone 16 to provide an initiation volume along a substantial length of the combustion zone 16 to allow for sustained combustion in relatively fuel-lean stoichiometry, relatively low static gas temperature conditions, and relatively fast time scale relative to the supersonic gas flow through the combustion zone 16. In the embodiment shown, the initiation volume 36 has a dimension transverse to the flow, thin relative to the combustor height, and is oriented at an acute angle to the gas flow direction to provide combustion initiation over a relatively planar surface resulting in a distribution of combustion heat release over a longitudinal distance in the combustor.

The present invention can generally allow for the use of fuels such as hydrocarbons in supersonic combustion within an acceptable combustion time scale relative to gas flow through the engine. The present invention can allow the use of volumetric free radical production to initiate the combustion of fuels such as methane under static air temperature conditions which would not otherwise ordinarily provide adequate fuel utilization within the flow time of gases in the combustion zone 16. Thus, by using the present invention to provide continued free radical production along a substantial length of the combustion zone 16 combustion can be sustained in relatively fuel lean stoichiometry and gas flow regimes in which the gas static temperature rise would not, in itself, be otherwise adequate to sustain high rate combustion kinetics. In addition, this general method of combustion can be applied to fuel combinations, such as hydrogen and hydrocarbons, in which a first type of fuel is provided which is capable of reacting relatively readily at low initial free radical concentrations to provide a chemical source of radicals for ignition of a second type of fuel, supplementing the radical production by volumetric diffuse discharge from an initiation source. Thus, one method of combusting fuel in a supersonic combustor flow duct of a ramjet engine would comprise the steps of supplying a fuel mixture substantially continuously into the flow duct, the fuel mixture comprising a first type of fuel and a second type of fuel. The first type of fuel would be capable of reacting relatively readily at initial low free radical concentrations to provide combustion, and igniting the fuel mixture in the flow duct of an engine by discharging volumetrically diffuse energy at the fuel to produce free radicals from the first type of fuel sufficient to initiate combustion of the first type of fuel and which provides a chemical source of free radicals for ignition of the second type of fuel within an appropriately fast time scale relative to gas flow through the flow duct for use in a supersonic ramjet engine. This can allow for the use of fuel such as hydrocarbons allowing for potential advantages in terms of vehicle design because of the fuels higher density and thus decreased fuel tank volume which can result in decreased vehicle drag losses and fuel tank mass.

It should be understood that the forgoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A supersonic combustion ramjet engine having a combustor with a combustion zone intended to channel gas flow at relatively high speed therethrough, the engine comprising:

means for substantially continuously supplying fuel into said combustion zone; and means for substantially instantaneously igniting a volume of fuel in said combustion zone for providing a spatially controlled combustion distribution, said igniting means having means for providing a diffuse discharge of energy into said volume, said volume extending across a substantially complete cross-sectional area of the combustion zone, said means for discharging energy being capable of generating free radicals within said volume of reactive fuel in said combustion zone such that fuel in said volume can initiate a controlled relatively rapid combustion of fuel in said combustion zone whereby combustion distribution in relatively high speed gas flows through said combustion zone can be initiated and controlled without dependence upon a flame holder or relatively high local static temperature in said combustion zone.

2. An engine as in claim 1 wherein said means for providing a volumetrically diffuse discharge of energy comprises an electron beam initiator.

3. An engine as in claim 2 wherein said igniting means further comprises means for providing an electric field in said combustion zone to maintain high electron-neutral collision energy.

4. An engine as in claim 1 wherein said means for providing a volumetrically diffuse discharge of energy comprises a high transient electric field to force diffuse volumetric breakdown and an electric field for maintaining electron-neutral collision energy to produce neutral dissociation.

5. An engine as in claim 1 wherein said means for providing a volumetrically diffuse discharge of energy comprises an ultraviolet breakdown initiator.

6. An engine as in claim 1 further comprising a portion of said combustor having at least one reflecting wall for reflecting energy and thereby enhancing spatial uniformity of free radical generation by the energy.

7. An engine as in claim 1 further comprising means for providing a magnetic field in said combustion zone for energy confinement.

8. An engine as in claim 1 wherein said discharge means comprises means for providing a continuous discharge of energy.

9. An engine as in claim 1 further comprising a power generator connected to said discharge means.

10. An engine as in claim 1 wherein said discharge means is recessed within a combustor wall of said combustor thereby not imposing significant gas flow drag losses in said combustion zone.

11. An engine as in claim 1 wherein said discharge means comprises means for discharging energy into a substantially large area of said combustion zone.

12. An engine as in claim 1 wherein said discharge means is suitably positioned to discharge energy longitudinally and traversely along said combustion zone.

13. An engine as in claim 1 wherein said discharge means can discharge energy along a substantial length of said combustion zone.

14. An engine as in claim 1 wherein said discharge means can substantially uniformly distribute energy over a transverse cross section of said combustion zone and a substantial length of said combustion zone.

15. An engine as in claim 1 wherein said discharge means discharges energy with a substantially uniform intensity across said volume.

16. A method of igniting reactive fuel in a combustion zone of a supersonic combustion ramjet engine comprising the steps of:

supplying reactive fuel relatively continuously into the combustion zone; and creating a diffuse electric discharge in a predetermined volume of reactive fuel and air in the combustion zone, the volume extending substantially completely across a cross-section of said combustion zone, to thereby generate free radicals in the reactive fuel and air and substantially instantaneously initiate rapid combustion from said volume such that combustion can occur in a relatively rapid time scale corresponding to the relatively fast fuel and air flow through the combustion zone and combustion can be initiated and maintained without a flame holder and without relatively high local static temperature in the combustion zone.

17. A method as in claim 16 wherein the step of creating a discharge is relatively continuous.

18. A method as in claim 16 wherein the energy discharge is at least partially transverse to a longitudinal axis of the air-fuel flow.

19. A method as in claim 16 wherein the energy discharge is angled relative to a longitudinal axis of the air-fuel flow.

20. A method as in claim 16 wherein the step of creating a diffuse electric discharge has a discharge of a substantially uniform intensity over said volume.

21. A method of initiating combustion of hydrocarbons under relatively low static gas temperature conditions in a supersonic combustor flow duct comprising the steps of:
   supplying air into the flow duct;
   supplying hydrocarbon fuel relatively continuously into the flow duct; and
   discharging energy from an initiation source into the fuel and air in the duct, the step of discharging being across a substantial cross-sectional area of the flow duct such that the energy is capable of generating free radicals within the hydrocarbon fuel and air in a spatially distributed manner to produce a spatially distributed ignition of fuel and air in the flow duct thereby enhancing the rate of combustion such that the hydrocarbon fuel can be combusted at a relatively fast rate and, hence, hydrocarbon fuels can be combusted within an appropriately fast time scale relative to gas flow through the flow duct for use in a supersonic ramjet engine.

22. A method of sustaining combustion of stoichiometrically lean fuel under relatively low static gas temperature conditions in a supersonic combustor flow duct comprising the steps of:
   supplying air into the flow duct;
   supplying fuel relatively continuously into the flow duct; and
   producing free radicals from the fuel and air in the flow duct by means of an initiation source which can produce a spatially distributed ignition of fuel, the free radicals being produced along a substantial length of the combustor flow duct, such that ignition of fuel occurs over a relatively large area and length of the flow duct to allow sustained combustion in relatively fuel lean stoichiometry, relatively low static gas temperature conditions and relatively fast time scale relative to the supersonic gas flow through the flow duct.

23. A method of combusting fuel in a supersonic combustor flow duct of a ramjet engine comprising the steps of:
   supplying air into the flow duct;
   supplying a fuel mixture substantially continuously into the flow duct, the fuel mixture comprising a first type of fuel and a second type of fuel, the first type of fuel being capable of reacting relatively readily at initial low free radical concentrations to provide combustion; and
   igniting the fuel mixture in the flow duct by discharging energy into the fuel and air in the flow duct to produce free radicals from the mixture of fuels and air sufficient to initiate combustion of the first type of fuel and which provides a chemical source of free radicals for ignition of the second type of fuel within an appropriately fast time scale relative to gas flow through the flow duct for use in a supersonic ramjet engine.

24. A method as in claim 23 wherein the ignition is substantially transverse to a direction of mixture flow in the flow duct.

25. A supersonic combustion ramjet engine having a combustor with a combination zone intended to channel gas flow at relatively high speed therethrough, the engine comprising:
   means for substantially continuously supplying fuel into said combustion zone; and
   means for substantially instantaneously igniting an area of fuel in said combustion zone for providing a spatially controlled combustion distribution, said igniting means having means for providing a diffuse discharge of energy into said area of said combustion zone, said means for discharging energy being capable of generating free radicals within said area of reactive fuel in said combustion zone with a substantially uniform intensity across a substantially complete cross-section of said combustion zone such that fuel in said area can initiate a controlled relatively rapid combustion of fuel in said combustion zone.

* * * * *